April 12, 1938.  W. L. GILL  2,113,938
PLATE CUSHIONING MEANS FOR ELECTRIC STORAGE BATTERIES
Filed Sept. 22, 1937

Inventor
Walter L. Gill
By Shepherd & Campbell
Attorneys

Patented Apr. 12, 1938

2,113,938

UNITED STATES PATENT OFFICE

2,113,938

PLATE CUSHIONING MEANS FOR ELECTRIC STORAGE BATTERIES

Walter L. Gill, Redlands, Calif.

Application September 22, 1937, Serial No. 165,213

4 Claims. (Cl. 136—79)

This invention relates to plate cushioning means for electric storage batteries. Its object is to provide a very simple and inexpensive element which will not only efficiently cushion the plates against vertical jar and jolt but will permit much greater lateral flexibility of the plates than has been possible with the means heretofore employed.

Briefly stated, the invention resides in providing a soft rubber cushioning element in the form of a sheath adapted to be slipped over the upstanding ribs constituting a part of the conventional structure of present widely used, hard rubber battery jars. I am aware of the fact that it is not broadly new to slip a soft rubber sheath over these conventional hard rubber ribs.

The present invention resides more particularly in providing additional cushioning means between the top of the sheath and the top of the hard rubber rib, of a nature to have a greater degree of yieldability than the top web of the sheath, and also to permit limited endwise and sidewise movement of the sheath on the rib in a manner which will be hereinafter set forth.

In the accompanying drawing.

Like numerals designate corresponding parts throughout the several parts of the drawing.

Figure 1:
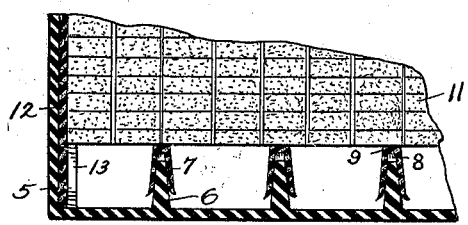
Figure 1 is a fragmentary sectional view of a portion of a battery jar having the invention applied thereto.
Figure 2:
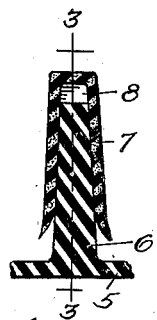
Fig. 2 is an enlarged sectional view through one of the hard rubber ribs of the battery jar, having the sheath of the present invention applied thereto.
Figure 3:
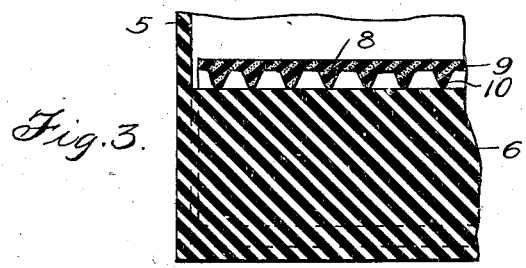
Fig. 3 is a sectional view on line 3—3 of Fig. 2.
Figure 4:
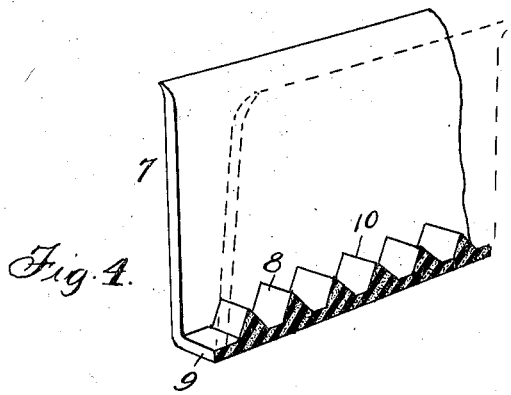
Fig. 4 is a fragmentary sectional perspective view of a part of the sheath of the present invention.

In the drawing, 5 designates a portion of a battery jar, said jar and the integral ribs 6, upstanding from the bottom thereof, being made of hard rubber or equivalent suitable material. The sheath of the present invention, indicated at 7, is made of soft rubber and, as will be seen by referring to Fig. 2, is of inverted U-form and is shaped and dimensioned to fit down over one of the hard rubber ribs 6.

As before stated, soft rubber sheaths of inverted U-shape have heretofore been used in this relation. However, my invention differs from these prior devices and any other of which I have knowledge, in that my sheath is provided, upon the inner side of its top surface, with a row of integral soft rubber teeth or projections 8. These teeth are fairly wide at their base portions where they join the top web 9 of the sheath, but they taper to fairly sharp edges 10, and it is these edges which rest upon the top of the rib 6.

Since these edges are fairly thin and are made of soft rubber, they have a high degree of yieldability. They not only yield to vertical thrust to cushion the battery plates 11, the lower edges of which rest upon the tops of the sheaths, but they yield to any tendency of the sheaths to move endwise under bodily sidewise movement of the plates 11, and they also tend to permit slight sidewise rocking of the tops of the sheaths upon the webs 6 under any tendency of the plates to move endwise.

If desired, the plates 11 may be additionally cushioned at their side edges by soft rubber cushioning webs 12 carrying projections 13 (only one of which is shown) and which engage between and aid in spacing the plates. However, this cushioning element 12 is no part of the present invention and is not being claimed in this application.

I wish it to be understood that the invention is not limited to the precise construction set forth, but that it includes within its purview whatever changes fairly come within either the terms or the spirit of the appended claims.

Having described my invention, what I claim is:

1. A sheath of soft rubber comprising side walls and a connecting top, shaped and dimensioned to fit upon and extend lengthwise of the plate-supporting rib of a battery jar, and projections disposed upon the underside of the top of said sheath and adapted to rest upon the top of the battery jar rib and to constitute additional cushioning elements of a greater degree of flexibility than the top of the sheath.

2. A structure as recited in claim 1, wherein said projections extend from side wall to side wall of the sheath and are integral therewith.

3. A structure as recited in claim 1, wherein said projections are in the form of a row of teeth of soft rubber, the teeth lying in spaced relation to each other and being materially thinner at their outer edges than at the base portions thereof where they join the top of the sheath.

4. The combination with a battery jar having an upstanding plate-supporting rib upon its bottom of hard rubber insulating material, of a soft rubber sheath shaped and dimensioned to fit upon said rib and to extend substantially throughout the length thereof, said sheath comprising a pair of side walls and a connecting top wall and a row of soft rubber teeth projecting from the top of said rib and tapering toward their lower and free edges, which edges are adapted in use to rest upon the top of the hard rubber rib, said teeth being spaced from each other and being integral with the top and the side walls of the sheath, as and for the purposes set forth.

WALTER L. GILL.